US012735177B2

(12) United States Patent
Kasap et al.

(10) Patent No.: US 12,735,177 B2
(45) Date of Patent: Sep. 15, 2026

(54) HELICOPTER

(71) Applicant: TUSAS—TURK HAVACILIK VE UZAY SANAYII ANONIM SIRKETI, Ankara (TR)

(72) Inventors: Hulusi Ali Kasap, Ankara (TR); Ahmet Alper Ezertas, Ankara (TR); Baris Can, Ankara (TR); Mehmet Cemil Kazanbas, Ankara (TR); Ahmet Alperen Gundogan, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 382 days.

(21) Appl. No.: 18/268,290

(22) PCT Filed: May 28, 2021

(86) PCT No.: PCT/TR2021/050502
§ 371 (c)(1),
(2) Date: Jun. 19, 2023

(87) PCT Pub. No.: WO2022/146289
PCT Pub. Date: Jul. 7, 2022

(65) Prior Publication Data

US 2024/0059407 A1 Feb. 22, 2024

(30) Foreign Application Priority Data

Dec. 31, 2020 (TR) ................................ 2020/22599

(51) Int. Cl.
*B64C 3/14* (2006.01)
*B64C 3/16* (2006.01)
(Continued)

(52) U.S. Cl.
CPC ................ *B64C 27/06* (2013.01); *B64C 3/14* (2013.01); *B64C 3/16* (2013.01); *B64C 27/26* (2013.01)

(58) Field of Classification Search
CPC ........................................................ B64C 3/16
See application file for complete search history.

(56) References Cited

U.S. PATENT DOCUMENTS 4,611,773 A * 9/1986 Goldhammer ............ B64C 3/00 244/35 R
5,102,068 A * 4/1992 Gratzer ..................... B64C 5/08 244/45 R
(Continued)

FOREIGN PATENT DOCUMENTS

CN 107719632 A * 2/2018 ............... B64C 3/00
EP 2690011 A1 1/2014
(Continued)

OTHER PUBLICATIONS

Translation of CN 107719632 A (Year: 2018).*
(Continued)

*Primary Examiner* — Philip J Bonzell
*Assistant Examiner* — Ryan Andrew Yankey
(74) *Attorney, Agent, or Firm* — Notaro, Michalos & Zaccaria P.C.

(57) ABSTRACT

A helicopter has a body exposed to air flow, at least one wing provided on the body, extending outward from the body and enabling ammunition and similar payloads to be placed thereto, a rotor generating the aerodynamic lift and/or thrust required for the body to take off, a tail provided on the body, extending outward from the body and providing balance during the movement of the body.

8 Claims, 4 Drawing Sheets

(51) Int. Cl.
*B64C 27/06* (2006.01)
*B64C 27/26* (2006.01)

(56) References Cited

U.S. PATENT DOCUMENTS

| | | | | |
|---|---|---|---|---|
| 5,542,625 | A | 8/1996 | Burhans, Jr. et al. | |
| 6,607,161 | B1 * | 8/2003 | Krysinski | B64C 29/0033 244/7 C |
| 7,100,867 | B2 * | 9/2006 | Houck, II | B63B 1/248 244/45 R |
| 7,275,711 | B1 * | 10/2007 | Flanigan | B64C 27/24 244/17.11 |
| 7,644,892 | B1 * | 1/2010 | Alford, Jr. | B64C 23/065 244/35 R |
| 9,321,526 | B2 * | 4/2016 | Fink | B64C 39/068 |
| 11,554,849 | B2 * | 1/2023 | Huyssen | B64C 9/06 |
| 2017/0101176 | A1 * | 4/2017 | Alber | B64C 3/32 |
| 2020/0324871 | A1 * | 10/2020 | Edwards | B64C 3/34 |
| 2020/0354048 | A1 * | 11/2020 | Melo | B64C 25/52 |
| 2022/0281593 | A1 * | 9/2022 | Stobbe | B64C 39/12 |

FOREIGN PATENT DOCUMENTS

| | | | |
|---|---|---|---|
| EP | 3650341 | A1 | 5/2020 |
| WO | 2020097367 | A1 | 5/2020 |

OTHER PUBLICATIONS

International Search Report and Written Opinion for PCT application No. PCT/TR2021/050502, mailed Oct. 12, 2021.

International Preliminary Report on Patentability, completed Nov. 21, 2022.

Demand/Request for Preliminary Examination dated Oct. 21, 2022.

International Application Status Report generated May 9, 2023.

* cited by examiner

HELICOPTER

This invention relates to the wings provided on attack helicopters.

Attack helicopters carry ammunition and similar payloads by their wings with lower aspect ratios, extending from their relatively narrow bodies. In traditional designs, the effect of the wings on the entire aerodynamic characteristics is intended to be at a minimum level, while the wingspan is determined at a minimum value that will ensure safe separation requirements. One of the major components in the total aerodynamic drag of attack helicopters is the ammunition-loaded wing component. In this context, ammunition-loaded wings have a large share in the body drag breakdown of the attack helicopter.

Unlike the weight-bearing columns used to carry external loads in civilian helicopters modified for military operations, ammunition and payloads such as external fuel tanks are carried by means of wings in attack helicopters. The bodies of attack helicopters are narrow as compared to those of civilian helicopters, wherein ammunition is placed on the outboard parts of the wing in the direction of wingspan in order to ensure a safe separation of ammunition from the air vehicle.

The United States patent document U.S. Pat. No. 5,542,625, which is included in the known state of the art, describes that the inboard part of each of the wing sections forms a dihedral angle with the body and the outboard part of each of the wing sections forms an anhedral angle with the inboard part, or alternatively, that the inboard part of each of the wing sections forms an anhedral angle with the body and the outboard part of each of the wing sections forms a dihedral angle with the inboard part.

With a helicopter developed by this invention, an enhancement is provided in the forward flight speed capability of the helicopter.

Another object of this invention is to provide the helicopter with the ability of operating with a higher weight at a high density altitude under hovering flight conditions.

A further object of this invention is to provide fuel saving while the helicopter is on mission.

The helicopter realized to achieve the object of the invention, as defined in the first claim and in the claims dependent thereon, comprises a body of the type of rotary wing air vehicles, ammunition disposed on the body so as to extend out of the body, fuel tanks, and more than one wing to which gun pods and similar loads are coupled. It comprises a rotor located on the body, enabling the body to move and creating the control moments with the aerodynamic lift and thrust required for the body to stay in the air. It comprises a horizontal tail that ensures longitudinal stability of the body during forward flight.

In the helicopter of the invention, the angle of the root part of the wing formed with the ground is determined by a geometric value that rises by forming a dihedral angle to the root part of the wing in terms of the wing extending outward from the body. A positive value of the dihedral angle indicates that the wing rises linearly in vertical in the direction of wingspan. It comprises the root region of the wing extending by rising with a dihedral angle outward from the site where the wing is connected to the body. The angle of the tip part of the wing with the ground is determined by the anhedral angle-forming geometric value assigned to the tip part of the wing. A positive value of the anhedral angle indicates that the wing lowers linearly in vertical in the direction of wingspan. It comprises a tip region extending from the root region by lowering with an anhedral angle. It comprises an angularly upside-down v-shaped bending region on the wing connecting the root region to the tip region. The profile cross-sections of the root region, tip region and bending region on the wing are all different from each other. The helicopter's wing design provides control and enhanced stability in the aerodynamic interaction of ammunition with the horizontal tail by narrowing the low-pressure wake flow region created behind the wing.

In an embodiment of the invention, in a helicopter, the line connecting all midpoints between the upper and lower non-symmetrical surfaces along the chord of the wing profile is called the hump curve, and the ratio between this curve's maximum vertical deviation to the chord line and the chord length is called the hump ratio. The hump ratio of the root region is greater than the hump ratio of the bending region. The hump ratio of the tip region is greater than the hump ratio of the bending region. The hump ratio of the tip region is greater than the hump ratio of the root region. The wing has different forms based on different hump ratios in the root region, tip region and bending region.

In an embodiment of the invention, the length of the chord line between the leading edge of the wing of the helicopter, which is the first site to contact air on the wing, and the trailing edge, which is the site where the air leaves the wing, narrows from the root region to the tip region.

In an embodiment of the invention, the helicopter comprises two wings aligned with the longitudinal position of the rotor center on the body, positioned symmetrically to the body in the lateral direction, under the rotor in terms of the vertical axis.

In an embodiment of the invention, the helicopter comprises at least one air intake that takes the air required for the operation of the engine that triggers the rotor. It comprises a root region of which the surface facing the lower surface of the air intake rises almost parallel thereto.

In an embodiment of the invention, the helicopter comprises two wings, in which the horizontal tail on the tail cone is positioned almost aligned in the water line and which is placed symmetrically in the lateral axis to the body.

In an embodiment of the invention, in the helicopter, the most ideal angular midpoint of the root region forming an angle of almost 25°-32° is that in which the dihedral angle is between 20°-45°. The most ideal angular midpoint of the tip region forming an angle of almost 25°-29° is that in which the anhedral angle is between 0°-30°.

In an embodiment of the invention, the section from where the wing is connected to the body up to the bending region is shorter. It comprises a bending region positioned almost at 42% of the wingspan.

In an embodiment of the invention, the helicopter comprises a body suitable for attacking purposes, with a narrowness where almost a pilot can fit. It comprises a narrow body design with an almost constant width from the base of the body to the center of the rotor along the water line.

In an embodiment of the invention, the helicopter comprises wings, of which the tip region are coupled ammunition and similar loads.

The helicopter realized to achieve the object of the present invention is shown in the accompanying figures, wherein from these figures.

Figure 1:
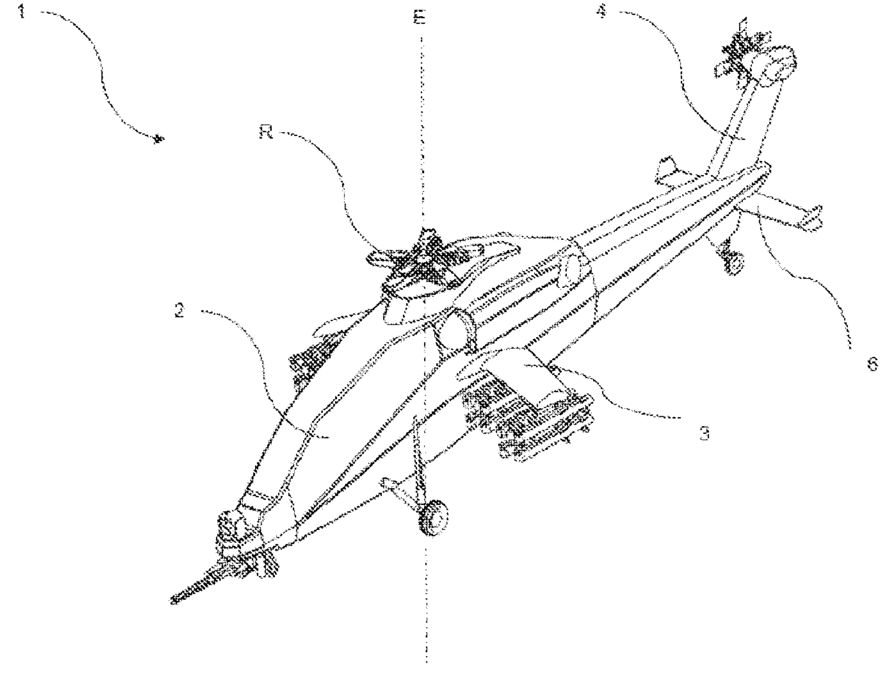
FIG. 1 is a perspective view of helicopter.
Figure 2:
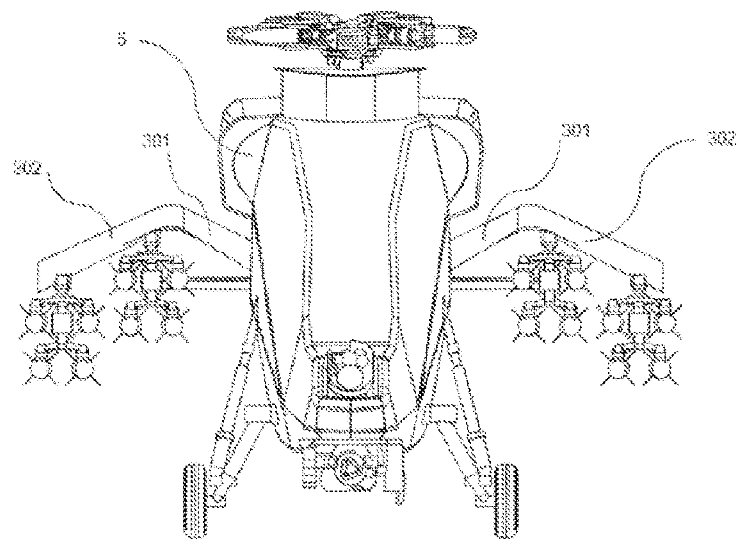
FIG. 2 is a front view of helicopter.
Figure 3:
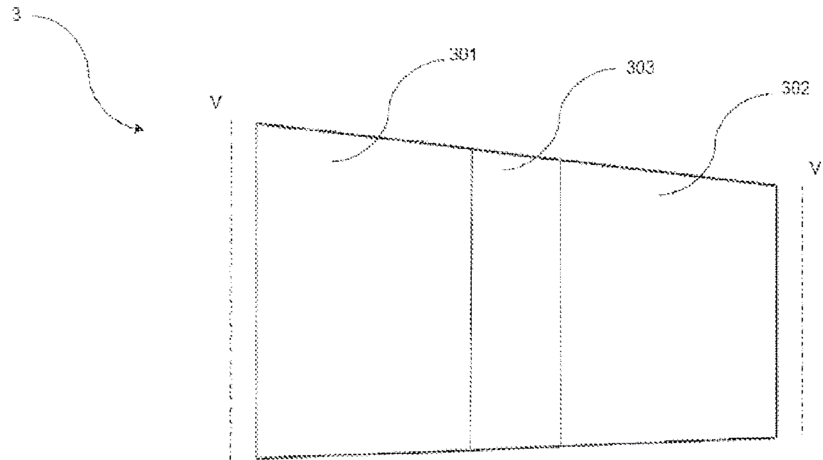
FIG. 3 is a top view of wing.
Figure 4:
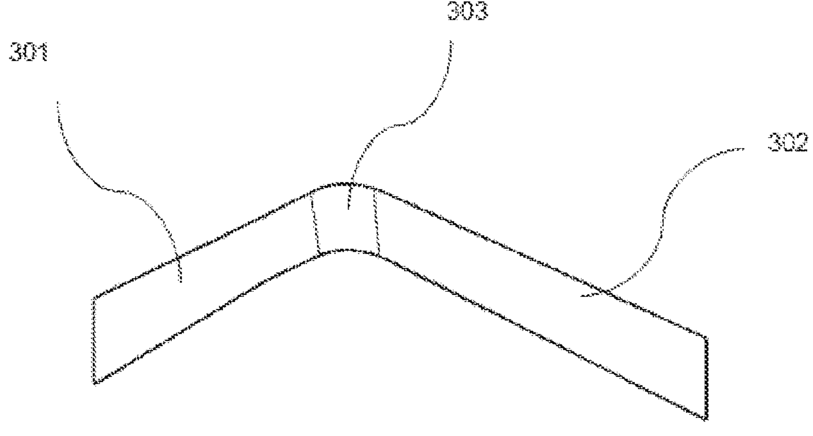
FIG. 4 is a front view of wing.
Figure 5:
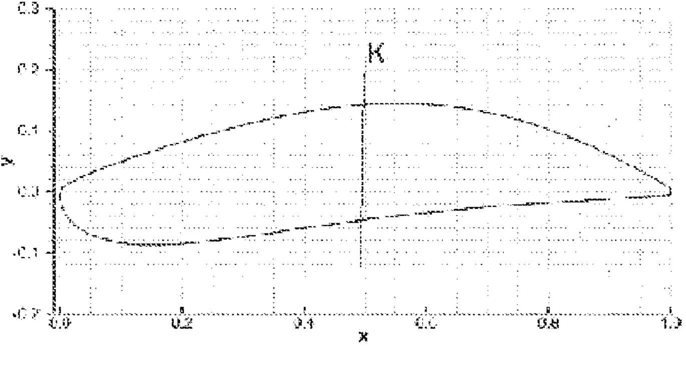
FIG. 5 is a profile cross-sectional analysis of the root region.
Figure 6:
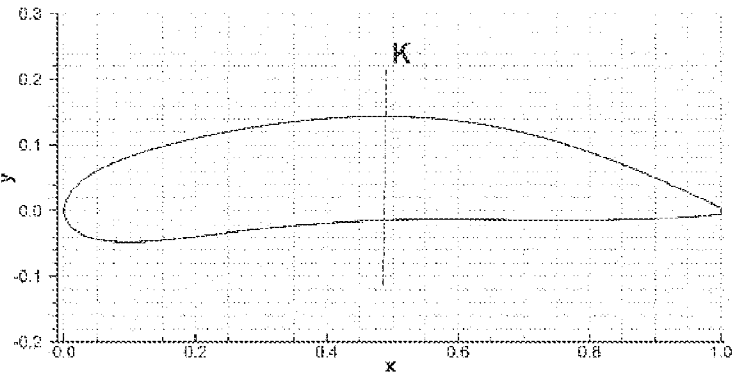
FIG. 6 is a profile cross-sectional analysis of the bending region.
Figure 7:
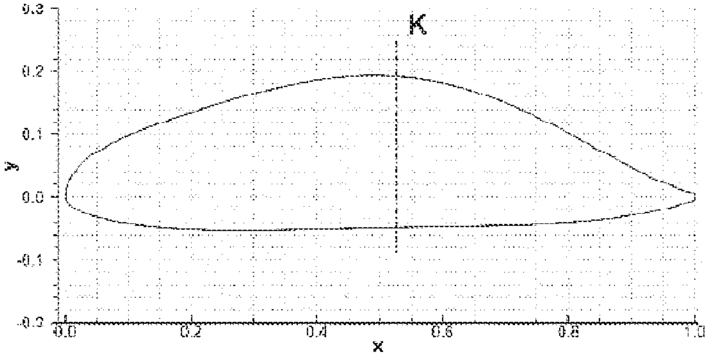
FIG. 7 is a profile cross-sectional analysis of the tip region.

The parts illustrated in figures are individually assigned a reference numeral and the corresponding terms of these numbers are listed below.

1. Helicopter
2. Body
3. Wing
301. Root region
302. Tip region
303. Bending region
4. Tail
5. Air intake
6, Horizontal tail
(R) Rotor
(K) Hump line
(V) Chord line
(E) Rotor axis The helicopter (1) comprises a body (2) exposed to air flow, at least one wing (3) provided on the body (2), extending outward from the body (2) and enabling ammunition and similar payloads to be placed thereto, a rotor (R) generating the aerodynamic lift and/or thrust required for the body (2) to take off, a tail (4) provided on the body (2), extending outward from the body (2) and providing balance during the movement of the body (2).

The helicopter (1) of the invention comprises a root region (301) on the wing (3) extending from the body (2) so as to form a dihedral angle, a tip region (302) on the wing (3) extending from the root region (301) so as to form an anhedral angle with the body (2), a bending region (303) between the root region (301) and the tip region (302) on the wing (3), connecting the root region (301) and the tip region (302) to each other, a wing (3) produced so as to have a different profile cross-section for each of the root region (301), tip region (302) and the bending region (303).

It comprises a body (2), at least one wing (3) on the body (2), extending outward from the body (2) and carrying ammunition and similar payloads on itself, and a rotor (R) on the body (2), enabling the movement of the body (2). It comprises a tail (4) that ensures the stability of the body (2) throughout the flight. Thanks to the wings (3) extending laterally outward from the body (2) of rotary wing air vehicles, ammunition, fuel tank and similar payloads are carried. It comprises a rotor (R) generating the aerodynamic lift and thrust required for the body (2) to take off, a tail (4) positioned on the tail (4) cone on the body (2), extending outward from the body (2); and providing stability to the flight characteristics of the body (2).

It comprises a root region (301) on the wing (3) extending from the body (2) so as to form a dihedral angle, a tip region (302) in connection with the root region (301) on the wing (3), extending from the root region (301) by forming an anhedral angle. It comprises a bending region (303) on the wing (3) between the root region (301) and the tip region (302) connecting these two regions to each other. It comprises a wing (3) produced with a different form for each of the root region (301), tip region (302) and bending region (303).

Thanks to the wing (3) with a bent-form, a more efficient air flow is provided and at the same time a higher flight performance and fuel saving as well as a higher speed in forward flight are ensured and the aerodynamic interaction between the rotor (R) and the wing (3) in a hovering condition is reduced to provide a hovering capability with higher weight.

In an embodiment of the invention, the helicopter (1) comprises a wing (3) having a profile cross-section along the hump line (K) on the wing (3) with the hump ratio of the root region (301) being greater than the hump ratio of the bending region (303) and the hump ratio of the tip region (302) being greater than the hump ratio of the bending region (303). Since the hump ratio of the root region (301) is higher than the hump ratio of the bending region (303) and the hump ratio of the tip region (302) is higher than the hump ratio of the bending region (303), the wings (3) are enabled to have a more efficient aerodynamic performance under air flow.

In an embodiment of the invention, the helicopter (1) comprises a wing (3) in which the length of the chord line (V) between the leading edge and the trailing edge of the wing (3) profile narrows from the root region (301) toward the tip region (302). The length of the chord line (V) decreases from the root region (301) toward the tip region (302).

In an embodiment of the invention, the helicopter (1) comprises a wing (3) located on the body (2) below the rotor (R) so as to be aligned with the rotor axis (E). It comprises two wings (3) located on the body (2) below the rotor (R) on the vertical axis, so as to be aligned with the rotor axis (E) in the longitudinal direction and positioned on the body (2) symmetrically in the lateral axis. The design of the bent-form wing (3) (upside-down v form) improves the aerodynamic interaction of the wing (3) with the rotor (R) wake flow and provides a higher hovering performance.

In an embodiment of the invention, the helicopter (1) comprises at least one air intake (5) on the body (2), taking the air required for the rotor (R) to operate, and a root region (301) of which the surface facing the lower surface of the air intake (5) extends almost parallel thereto. The wing (3) extending almost in parallel to the air intake (5), provides an enhanced aerodynamic performance.

In an embodiment of the invention, the helicopter (1) comprises at least one horizontal tail (6) positioned on the tail (4), providing balance during movement, and a wing (3) on the body (2) so as to be almost aligned with the horizontal tail (6). It comprises at least one horizontal tail (6) positioned on the tail (4), providing longitudinal stability throughout a flight, a wing (3) on the body (2) in a waterline position almost similar to that of the horizontal tail (6). Thanks to the improvement in the aerodynamic interaction of the wing (3) with the horizontal tail (6), a higher flight performance is provided.

In an embodiment of the invention, the helicopter (1) comprises a root region (301) with a dihedral angle between 20°-45°, and an tip region (302) with an anhedral angle between 0°-30°. Thanks to the fact that the dihedral angle is 25°-32°) and the anhedral angle is 25°-29°, a higher flight performance is ensured.

In an embodiment of the invention, the helicopter (1) comprises a wing (3) in which the root region (301) is shorter than the tip region (302). It comprises a wing (3) bending region (303) positioned almost at 42% from the root region (301) of the wing (3). It comprises that the length of the root region (301) on the wing (3) is longer than the length of the tip region (302).

In an embodiment of the present invention, the helicopter (1) comprises a body (2) suitable for attacking purposes with a narrowness where almost a pilot can fit.

In an embodiment of the present invention, the helicopter (1) comprises a wing (3) having a tip region (302) to which ammunition and similar payloads are placed. It is ensured that the ammunition is separated safely without interacting with the body (2).

The invention claimed is:

1. A helicopter (1) comprising:

a body (2) exposed to air flow, at least one wing (3) provided on the body (2), extending outward from the body (2), a rotor (R) generating the aerodynamic lift and/or thrust required for the body (2) to take off, a tail (4) provided on the body (2), extending outward from the body (2) and providing balance during the movement of the body (2), a root region (301) on the wing (3) extending from the body (2) so as to form a dihedral angle, a tip region (302) on the wing (3) extending from the root region (301) so as to form an anhedral angle with the body (2), a bending region (303) between the root region (301) and the tip region (302) on the wing (3), connecting the root region (301) and the tip region (302) to each other, the bending region (303) having an angularly upside-down V-shape and being positioned at about 42% of a wing-span measured from the root region (301), wherein the wing (3) is configured to support external payloads thereon and is produced so as to have a different profile cross-section for each of the root region (301), tip region (302) and the bending region (303);

wherein the wing (3) has a profile cross-section along a hump line (K), which is the line connecting all mid-points between the upper and lower non-symmetrical surfaces along the chord of the wing profile, on the wing (3) with a hump ratio, which is the ratio between the hump line's (K) maximum vertical deviation to the chord line and the chord length, of the root region (301) being greater than the hump ratio of the bending region (303) and a hump ratio of the tip region (302) being greater than the hump ratio of the bending region (303); and wherein the upside-down V-shaped wing configuration improves aerodynamic interaction of the wing (3) with rotor (R) wake flow to provide enhanced hovering performance, and provides control and enhanced stability in aerodynamic interaction of ammunition with a horizontal tail (6) by narrowing a low-pressure wake flow region created behind the wing (3).

2. The helicopter (1) as claimed in claim 1, wherein the wing (3) in which the length of a chord line (V) between the leading edge and the trailing edge of the wing (3) profile narrows from the root region (301) toward the tip region (302).

3. The helicopter (1) as claimed in claim 1, wherein the wing (3) is located on the body (2) below the rotor (R) so as to be aligned with an axis (E) of the rotor (R).

4. The helicopter (1) as claimed in claim 1, comprising at least one air intake (5) on the body (2) taking the air required for the rotor (R) to operate, wherein a surface of the root region (301) positioned below and facing a lower surface of the air intake (5) extends parallel to the lower surface of the air intake (5), such that the wing (3) extends almost in parallel to the air intake (5) to provide enhanced aerodynamic performance.

5. The helicopter (1) as claimed in claim 1, comprising at least one horizontal tail (6) on the tail (4), providing balance during movement, wherein the wing (3) on the body (2) is aligned with the horizontal tail (6).

6. The helicopter (1) as claimed in claim 1, wherein the root region (301) has a dihedral angle between 20°-45°, and the tip region (302) has an anhedral angle between 25°-29.

7. The helicopter (1) as claimed in claim 1, wherein the root region (301) of the wing (3) is shorter than the tip region (302) thereof.

8. The helicopter (1) as claimed in claim 1, wherein the wing (3) has a tip region (302) configured for placement of payloads.

* * * * *